Patented Nov. 21, 1939

2,180,367

UNITED STATES PATENT OFFICE 2,180,367

METHOD OF PRODUCING MIXTURES FOR USE IN THE MANUFACTURING OF RUBBER GOODS AND IN ALLIED BRANCHES OF INDUSTRY

Fritz Rostler and Vilma Mehner, Vienna, Austria, assignors to Naftolen-Gesellschaft zur Verwertung der Rostler-Mehner'schen Verfahren m. b. H., Vienna, Germany, a corporation of Austria, now Germany No Drawing. Application September 29, 1937, Serial No. 166,392. In Austria October 4, 1935

11 Claims. (Cl. 106—23)

This invention relates to the production of mixtures for use in the manufacturing of rubber goods and in similar branches of industry.

It is known and customary to use mineral oil products such as Vaseline oil, paraffin, and the like as softening agents in rubber mixtures. These products are not of course vulcanizable and may only be added in relatively slight quantities, since larger additions thereof are bound on the one hand to have an excessive and useless softening action, and on the other hand are apt to sweat out of the finished vulcanizates.

The present invention relates to the production of mixtures for use in the rubber industry and in related branches of manufacture, with the addition of new products which are obtained from certain definite starting materials by accurately controllable methods adapted to serve the end in view. These new products have non-varying properties, and yield finished products with at least as small a limit of error as pure rubber. It is emphasized at this point that a manufacturing method only becomes practicable on an industrial scale when a result once achieved by such method can be obtained with certainty on subsequent repetitions thereof and whenever desired, and this applies especially to the rubber industry. The work which led to the making of the present invention was therefore primarily directed to obtaining a raw material which fulfils all the above indicated requirements in the matter of purity and capacity for standardization.

We have found that certain residues of mineral oil refining which have hitherto been the subject of but little scientific investigation contain a group of compounds of hydrocarbon nature, which may be isolated or recovered from these residues in the form of uniform products. It is not feasible to employ all refining residues, tars, etc., for this purpose, but the acid sludges obtained in the ordinary sulfuric acid refining of mineral oils, and especially the refining of lubricating oils with concentrated sulfuric acid (the monohydrate of approximately 96 to 98 per cent strength) are well suited for our purpose. We do not desire to employ, however, the sludges obtained in refining with fuming sulfuric acid or oleum ($H_2SO_4.SO_3$); or the sludges resulting from refining cracked products, and especially the lighter cracked products, since, as is well known, these sludges differ considerably from the acid sludges obtained in the ordinary refining of uncracked mineral oil products such as lubricating oil.

The present invention, which is described in detail hereinbelow, became possible only after it was ascertained that the acid sludges produced in lubricating oil refining, for example, consist of certain definite linkage products of sulfuric acid and organic substances, and that these organic substances could be separated from the sulfuric acid as hydrocarbons if the sludge was suitably treated.

For the purpose of preparing the said products to be used in accordance with the invention the acid sludges are treated, after analytical determination of the total amount of acid present therein, with an excess of neutralizing agent. As neutralizing agents for this purpose there may be used metals, their oxides or hydroxides, and suitable salts such as carbonates. The solid neutralization mixture thus obtained is then advantageously distilled in a vacuum high enough so that a distilling temperature of 380° C. need not be exceeded in completely removing the organic reaction product at the prevailing low partial pressure. This method of operating is described in more detail in our co-pending applications, Serial No. 751,891, filed November 7, 1934, and Serial No. 138,666, filed April 23, 1937. Another method of preparing the desired products consists in splitting the acid sludges by boiling with solutions or suspensions of neutralizing agents in sufficient quantity to neutralize the whole of the acid present, and distilling the resulting organic reaction product in a vacuum under the conditions specified above, as described in our application, Serial No. 149,183, filed June 19, 1937. As a general rule it may be stated that in both methods of working a vacuum between 3 and 40 mm. mercury column is used. For the purpose of preparing the desired products the solid neutralization mixture or (in the case of the second method) the organic reaction product may be subjected to extraction with organic solvents such as ether, hydrocarbons, ethyl acetate, chlorinated hydrocarbons, and acetone, and the extract thus obtained is then distilled in a vacuum under the same conditions as those specified above, after the solvent has been evaporated off, and if desired with the renewed addition of small quantities of neutralizing agent.

The products thus obtained are well adapted for employment in the rubber industry in accordance with the present invention. They are reddish-brown, greenly fluorescing oils, or more or less liquid resins or both, and are chemically definable as highly molecular extremely viscous, slightly unsaturated hydrocarbons, substantially free of sulphur, nitrogen, oxygen, and groups which exert an uncontrollable influence on vulcanization, such as $SO_3H'$, $NH''$, $SH'$, and so forth. By taking care to ensure that in the course of the manufacturing process no parts containing copper, manganese, brass or bronze come in contact with the product these hydrocarbons may also be produced free from rubber poisons. These hydrocarbons are distinguishable from the usual mineral oil hydrocarbons by the fact that they are soluble in aniline and acetone, and more particularly by the fact that they are soluble in concentrated sulphuric acid. Their boiling points are much higher than those of the corresponding refined products from which the acid sludge used is derived (they distil over as a rule between 150 and 380° C. in a vacuum of 12 mm. Hg column). Their viscosity is likewise of a far higher order, for instance 100–200 times as high, at ordinary temperatures, as that of the corresponding refined mineral oil product. They react but slightly, if at all, or react hardly noticeably, with dilute reagents, whereas they react extremely readily with concentrated reagents; thus, for instance, they yield linkage products when treated with concentrated acids (nitric acid yields solid nitro products, and with sulphuric acid a product similar to the original acid sludge is re-formed). Their iodine numbers are low, often lower than 20. It is not possible to hydrogenate them under the conditions usually effective with mineral oils. They have very great affinity for sulphur, and when heated with small quantities of sulphur (say 4%) they form more highly viscous derivatives or polymerization products. Analysis shows their composition to approximate to the values $C=90\%$, $H=10\%$, which would indicate the formula $(C_3H_4)_n$, the molecular weight being on an average approximately 600. The hydrocarbons to be used in accordance with the invention may thus be defined as being highly molecular, slightly unsaturated, highly viscous, products of high boiling point, with great affinity for sulphur and closely allied to rubber $(C_5H_8)_x$. These new hydrocarbons are known commercially as "Naftolenes". The non-fractioned product obtained from lubricating oil acid sludge is designated by us "Naftolen R 100"; by fractional distillation under the above specified conditions (in vacuo) there are obtained the products called by us "Naftolen 510", "Naftolen 530", and "Naftolen 550" which differ from each other macroscopically by their different degrees of viscosity. The following are the boiling point limits for the different grades (fractions):

"Naftolen R 100"_____ approx. 180–380° C. at 12 mm. Hg
"Naftolen 510"_____ approx. 180–250° C. at 12 mm. Hg
"Naftolen 530"_____ approx. 250–280° C. at 12 mm. Hg
"Naftolen 550"_____ approx. 280–340° C. at 12 mm. Hg Sometimes there is obtained a "Naftolen 570" which has a boiling point between 340 and 380° C. at a vacuum of 12 mm. Hg column.

The present invention relates to the employment of these products as bulking and filling agents for rubber; as softeners and regenerating agents in the rubber industry; and in the related branches of industry, such as the linoleum, oilcloth, and artificial leather industries, in the manufacturing of plastic compositions, impregnating agents, insulating products, and the like, for which they were well adapted, owing to their similarity to rubber.

In combination with rubber or rubber-like materials these hydrocarbons become so similar to rubber, etc. (apparently because of the formation of bridge linkages with rubber or sulphur) that they may be incorporated in large quantities in a large variety of rubber mixtures. The finished rubber goods thus obtained have mechanical properties which are not more than slightly inferior to those of goods made from pure rubber mixtures and which may even be superior thereto, as the following comparative table shows.

*Soft rubber mixtures*

|  | Composition in parts by weight | | | |
|---|---|---|---|---|
| Smoked sheets | 39 | 39 | 39 | 48 |
| Vulkazit F | 0.30 | 0.30 | 0.30 | 0.40 |
| Naftolen 510 | 10 | ------ | ------ | ------ |
| Naftolen 550 | ------ | 10 | ------ | ------ |
| Naftolen R 100 | ------ | ------ | 10 | ------ |
| Sulphur | 1.13 | 1.13 | 1.13 | 1.10 |
| Stearic acid | 0.57 | 0.57 | 0.57 | 1 |
| Calcium carbonate | 44 | 44 | 44 | 44 |
| Active zinc oxide | 5 | 5 | 5 | 5.50 |
| Total | 100.00 | 100.00 | 100.00 | 100.00 |
| Vulcanization | 20×2 | 20×2 | 20×2 | 20×2 |
| Tension at 300% | 33.90 | 38.90 | 32.60 | 28.80 |
| 3 days aged | 42.80 | 42 | 37.50 | 35 |
| 6 days aged | 44 | 46 | 40 | 33.70 |
| Breaking load in kgs. per sq. cm. | 94.40 | 96 | 94.70 | 89 |
| 3 days aged | 88 | 69 | 82.60 | 77.50 |
| 6 days aged | 76 | 72 | 68.2 | 61 |
| Elongation in percent | 550 | 535 | 575 | 535 |
| 3 days aged | 540 | 505 | 545 | 515 |
| 6 days aged | 450 | 410 | 420 | 430 |
| Hardness according to the Schopper scale | 108 | 108 | 109 | 91 |
| Specific gravity | 1.45 | 1.48 | 1.45 | 1.40 |

The new hydrocarbon products described hereinabove thus represent a good rubber bulking agent which is the more valuable in that it may be used in relatively large quantities in proportion to the rubber content of the mixture without depreciating the quality of the finished goods. In the case of vulcanite mixtures the addition of these products leads to an appreciable increase in strength and to an improvement of the final product as regards blackness and gloss. As regards tensile strength, the following comparative figures obtained with vulcanite mixtures containing the new admixing products are illustrative of the benefits obtainable by the application of our new hydrocarbons.

| Constituents | Amounts in parts by weight | | | | | | | |
|---|---|---|---|---|---|---|---|---|
| Smoked sheets | 100 | 90 | 100 | 90 | 100 | 90 | 100 | 90 |
| Naftolen | ---- | 10 | ---- | 10 | ---- | 10 | ---- | 10 |
| Sulphur | 20 | 19 | 30 | 28 | 40 | 37 | 45 | 41.50 |
| Vulkazit D | 1 | 1 | 1 | 1 | 1 | 1 | 1 | 1 |
| Tensile strength in kgs. per sq. cm. | 72 | 102 | 533 | 740 | 634 | 740 | 630 | 767 |

Even mixtures containing 50%, and in some cases actually more, of these hydrocarbons (referred to the amount of crude rubber in the mixture) are suitable for practical use. Goods of particularly high quality are obtained by the addition of these products to mixtures containing soot or carbon black. With these mixtures the desired result is best achieved by replacing the rubber content to the extent of about 10-20% by Naftolen plus carbon black, while retaining or reducing the usual proportion of sulphur and/or accelerator. In certain cases the sulphur content of the mixture may also be increased by 0.5 to 1%, but the proportion of accelerator used need not be increased. In the case of mixtures containing carbon black, as in the case of all mixtures containing active fillers, the effect of the added new hydrocarbons is due to the fact that its dispersing action enables the superficial activity of the carbon black to develop to a considerably increased extent, while preventing the hitherto considerable absorption of sulphur and accelerator by agglomerations of the active filler. The accelerating effect of our new hydrocarbons on vulcanization thus has a physico-chemical explanation; and an important cause of this acceleration is the fact that the reacting velocity of the extremely finely divided, and to a certain extent dissolved, agents present is increased.

Good results are also obtained with the so-called leathery vulcanizates, that is to say vulcanizates such as are used for packings and washers, technical material, and soles for boots and shoes. In the manufacturing of these products it is as a rule advisable to work in the hydrocarbons employed in accordance with our invention together with the inorganic fillers as rapidly as possible on the rolls, so as not to masticate the rubber excessively and so as not to push dissolving of the rubber in the hydrocarbons too far.

To work our new hydrocarbons successfully into known mixtures containing factis (rubber substitute) the procedure may be to replace with Naftolen, for example the whole or a part of the factis or a part of the factis and part of the rubber contained in the mixture. In this manner it becomes possible to produce better and cheaper mixtures without loss in quality, as is shown by the results obtained in the following tests:

Composition of mixture:

|  | Parts by weight |
|---|---|
| Light crepe | 100 |
| Sulphur | 3 |
| Factis | 40 |
| Zinc oxide | 5 |
| Magnesium carbonate | 30 |
| Stearic acid | 1.3 |
| Vulkazit mercapto | 0.8 |
| Soot | 1 |

After being worked up in the known manner this mixture, which is of the type 100 parts of rubber to 40 parts of factis, gives the following figures for the physical properties:

Breaking strain, 86 kgs./cm.$^2$; elongation, 690%

After altering this mixture into one of the type 100 parts of rubber to 10 parts of factis and 30 parts of our new hydrocarbons there were obtained products having the following physical properties:

Breaking strain, 154 kgs./cm.$^2$; elongation, 860%

After altering the mixture to the type 100 parts of rubber to 15 parts of factis and 45 parts of naphtholene there was obtained a product having the following properties:

Breaking strain, 93 kgs./cm.$^2$; elongation, 590% with an increase in the quantity of the mixture obtained.

The new hydrocarbons to be used in accordance with the invention may be incorporated either in a vulcanized or in a non-vulcanized form. In vulcanized mixtures these hydrocarbons, provided they are used in suitable proportions, enhance the adhesiveness of the rubber mixture and counteract drying up. On account of this property they represent a valuable constituent in the mixtures used in the manufacturing of sealing tape, insulation tape, and the like. In view of the fact that they become thinly liquid when slightly heated in a non-vulcanized state they may be used in the production of brake linings, hardened asbestos coating compositions, and the like. The process involved may conveniently consist in simply soaking the asbestos fabric or other material to be hardened, in a solution in the said hydrocarbons of sulphur and other suitable additions such as rubber, resins, and vulcanization accelerators, and subsequently heating the steeped fabric under the usual conditions for vulcanization.

Thanks to the good vulcanizing properties of our new hydrocarbons and due to their great affinity for sulphur, they may be worked into rubber mixtures in large quantities. Such additions have a marked softening effect, but, and this is a feature of considerable significance, this softening effect may be regulated to obtain final products (vulcanizates) of the required properties, by appropriately varying the proportion of sulphur used. Thus, for instance, mixtures containing 50% (referred to the rubber content) of these hydrocarbons, which are liquid prior to vulcanization, yield excellent vulcanite, since the added hydrocarbons use up sulphur and become hard during vulcanization, provided the quantity of sulphur used be appropriately large.

Since the capacity of our new hydrocarbon materials (which are excellent swelling and dissolving agents for rubber) for combining with sulphur in the presence of rubber and under the conditions of vulcanization is greater than that of rubber, these products also constitute a valuable regenerating agent. By proper application of these materials it is possible to regenerate or plasticize vulcanized products to a greater extent than has hitherto been feasible, by virtue of the fact that on the one hand the free sulphur is combined by the addition of these unsaturated hydrocarbons while on the other hand, by the extensive alloying of the rubber with "Naftolen" for example, the capacity of the mixture for taking up sulphur is still further increased.

The regeneration of old rubber (such as scrapped tire casings) may be effected for instance by heating this scrap with 10–15% of our new hydrocarbons (referred to the amount of old rubber taken), 12% of solid NaOH, and the quantity of water requisite to wet the whole amount of scrap used (the caustic soda being dissolved in this water), with agitation, in a boiler, for 8 to 24 hours, up to a pressure of 12–15 atmospheres absolute pressure. The aqueous lye is then drawn off and the regenerated rubber is washed and dried and then screened (preferably by forcing it through a spraying nozzle) and plasticized between rolls. Since our hydrocarbons constitute an addition which is closely allied to rubber it need not be subsequently removed like other known regenerating agents, but, notwithstanding the relatively large percentages in which it is used (which may be as high as 30% or even higher, referred to the amount of old rubber taken), may be further worked up together with the regenerate. This results in a very considerable simplification of procedure and an increase in the total quantity of product. The above-mentioned bulking of the rubber mixture in which the regenerate is subsequently used is thus effected in advance, which is a further advantage of the method according to the present invention, especially in view of the large scale on which regenerated rubber is used at the present time. The regenerates produced with the use of our new hydrocarbons are highly supple, and may be worked up in known manner, after the fresh addition of sulphur, either alone or in commixture with crude rubber, into rubber goods. A further advantage of such regenerates produced with the use of these hydrocarbons is that they do not tend to dry and may be stored for any length of time without risk. Several methods of reclaiming and regenerating rubber with the assistance of our new hydrocarbons are described in more detail and claimed in our co-pending application, Serial No. 263,810, filed March 23, 1939.

The employment of the hydrocarbons added in accordance with the invention in rubber mixtures also affords excellent protection of the finished goods from aging, as the following comparison shows:

"Ideal" sheet mixtures

| Constituents | Parts by weight | |
|---|---|---|
| Smoked sheets | 34.6 | 34.6 |
| Vulkazit C. T | 0.3 | 0.3 |
| Sulphur | 6.6 | 6.6 |
| Vulcanite powder | 28.9 | 29 |
| Naftolen 550 | 26.6 | |
| Zinc oxide (active) | 3 | |
| Tar, boiled | | 26 |
| Lime | | 15.5 |
| | 100.00 | 112.00 |

| | | |
|---|---|---|
| Vulcanization | 60×4 | 60×4 |
| Breaking strain in kgs. per cm.² | 78 | 47 |
| 3 days aged | 77.3 | Hard |
| Elongation in percent | 140 | 120 |
| 3 days aged | 125 | |
| Specific gravity | 1.12 | 1.15 |

In spite of the reddish-brown color peculiar to the hydrocarbons to be used in accordance with the invention, they do not cause any appreciable change in the shades of light colored rubber mixtures provided they are not added in very great quantities. In any case, the addition of an increased amount of white pigment coloring matter (titanium white) restores the color of the mixture to very nearly the original shade. By distilling such hydrocarbons in vacuo before addition to rubber mixtures, they may be obtained in a higher degree of purity, which is especially desirable in the production of rubber goods of very high quality.

The hydrocarbons employed in accordance with the invention may also be worked up with latex. When used with suitable emulsifiers such as ammonium oleate, sulphonated or oxidized olive oil, or Nekal (a preparation made by the I. G. Farbenindustrie A. G. and acting as an emulsifier) they yield, with latex solutions, mixtures which represent for instance valuable impregnating solutions for brake linings, cement solutions, dip goods, heavily filled floor and road covering materials, and the like.

An outstanding feature of the present invention is that high quality natural rubber need not always be used, but that it is also possible to use poor quality rubber and yet to obtain good results. In accordance with the present invention our new hydrocarbons may also be employed in conjunction with synthetic rubber and other rubber substitutes. Expensive kinds of synthetic rubber may be worked up into a more economical product by bulking with these hydrocarbons, while at the same time those products of this nature which are difficult to masticate lose this disadvantage when similarly treated. This effect is best observed in connection with the working up of synthetic rubbers (Buna, Neopren, alcohol rubber) which can only be masticated on cold rolls. It is also feasible to work up the poor quality synthetic rubbers such as the methyl rubbers (polymerization products of dimethyl-butadiene

used for a time during the World War, since the majority of the objections to these products, such as for example premature ageing and brittleness, are thereby obviated.

The following examples of recipes, given partly in the form of comparisons between mixtures made with our hydrocarbons and pure rubber mixtures, afford a comprehensive review of the uses to which the specified hydrocarbons may be put and of their quality improving effect on the finished goods produced from such mixtures. In ascertaining the physical properties of the finished goods (elongation, tensile strength, and the like) the same test conditions and methods were of course adopted throughout, this being a prerequisite for obtaining comparative figures.

EXAMPLES (1) Soft rubber

| | Parts by weight |
|---|---|
| Smoked sheets | 30 |
| Naftolen 550 | 12.9 |
| Sulphur | 1.6 |
| Zinc oxide | 15 |
| Vulkazit F | 0.2 |
| Chalk prec | 50 |
| Stearic acid | 0.3 |
| | 110.00 |
| Vulcanization | 20×2 |
| Tension at 300% | 32 |
| 3 days aged | 32.5 |
| 6 days aged | 30.5 |
| Breaking strain, kgs./cm.² | 78.5 |
| 3 days aged | 62.5 |
| 6 days aged | 48.5 |
| Elongation in per cent | 550 |
| 3 days aged | 470 |
| 6 days aged | 470 |

(2) Gas hose mixture, extruded

| | |
|---|---|
| Light crepe | 49.40 |
| Naftolen 530 | 4.94 |
| Factis | 9.88 |
| Sulphur | 1.48 |
| Zinc oxide | 2.47 |
| Chalk | 24.77 |
| Lithopone | 4.94 |
| Vulkan orange | 0.74 |
| Vulkan red L. C. F | 0.89 |
| Vulkazit F | 0.49 |
| | 100.00 |

(3) *Dip solution for impregnating brake linings*

I. Naftolen R 100__ 37.5 ⎱ Dissolved in the heat
   Sulphur _____ 20.0 ⎰
II. Naftolen R 100__ 37.5 ⎱ Dissolved in the heat
    Smoked sheets__ 5.0 ⎰

The solutions I and II are homogenized and diluted with gasoline as required.

After impregnation the brake linings are heated at 185–200° C. for 4–6 hours.

(4) *Fabric coating mixture*

| | Parts by weight |
|---|---|
| Light crepe | 41.88 |
| Naftolen R 100 | 10.47 |
| Sulphur | 1.26 |
| Vulkazit F | 0.70 |
| Aldol | 0.35 |
| Zinc oxide | 3.50 |
| Chalk | 13.92 |
| Flame soot (lamp black) | 27.92 |
| | 100.00 |

Hot air vulcanized at 130° C. for 20 mins.

(5) *Vulcanite*

| | Parts by weight |
|---|---|
| Smoked sheets | 54.4 |
| Vulkazit C. T | 0.6 |
| Naftolen 550 | 20 |
| Sulphur | 22.4 |
| Magnesium oxide, light | 1.6 |
| Zinc oxide | 1 |
| | 100.00 |

Vulcanization 60×4; breaking strain, 603 kgs./cm.$^2$ (6) *Vulcanite mixture*

| | Parts by weight |
|---|---|
| Brown crepe | 28 |
| Naftolen R 100 | 25 |
| Sulphur | 19 |
| Vulcanite powder | 27 |
| Zinc oxide | 1 |
| | 100.00 |

Vulcanization 180 × 4; breaking strain 226 kgs./cm.$^2$ (7) *Mixture for pressed articles and red soling sheets (gym. soles)*

| | Parts by weight |
|---|---|
| Smoked sheets | 32.30 |
| Naftolen 550 | 6.60 |
| Zinc oxide, active | 2.18 |
| Red oxide of iron | 3 |
| Kieselguhr | 54.37 |
| Sulphur | 1.20 |
| Vulkazit mercapto | 0.21 |
| Vulkazit D | 0.14 |
| | 100.00 |
| Vulcanization | 15×3 |
| Breaking strain in kgs./cm.$^2$ | 60 |
| 3 days aged | 45 |
| 5 days aged | 55.40 |
| Elongation in per cent | 200 |
| 3 days aged | 115 |
| 6 days aged | 130 |
| Hardness (Schopper scale) | 33 |
| Loss by abrasion | 0.98 |
| Specific gravity | 1.42 |

(8) *Sole sheet mixtures*

| Constituents | Parts by weight | |
|---|---|---|
| Smoked sheets | 37.15 | 34.53 |
| Vulkazit mercapto | 0.44 | 0.42 |
| Vulkazit D | 0.11 | 0.11 |
| Naftolen 550 | | 8.70 |
| Naftolen 510 | 9.40 | |
| Sulphur | 1.70 | 1.50 |
| Micronex | 46.20 | 50.10 |
| Zinc oxide, active | 5 | 4.64 |
| | 100.00 | 100.00 |
| Vulcanization | 20×4 | 20×4 |
| Breaking strain kgs./cm.$^2$ | 186 | 183 |
| 3 days aged | 94 | 103 |
| 6 days aged | 75.50 | 95 |
| Elongation in percent | 260 | 215 |
| 3 days aged | 145 | 135 |
| 6 days aged | 100 | 100 |
| Hardness (Schopper scale) | 23 | 20 |
| Loss by abrasion | 0.24 | 0.16 |
| Specific gravity | 1.29 | 1.33 |

(9) *Sole sheet mixture, without addition of Naftolen*

| Constituents | Parts by weight | | |
|---|---|---|---|
| Smoked sheets | 45 | 34.53 | 43.23 |
| Vulkazit mercapto | 0.50 | 0.42 | 0.45 |
| Vulkazit D | 0.15 | 0.11 | 0.12 |
| Sulphur | 1.70 | 1.50 | 1.50 |
| Micronex | 46.20 | 50.10 | 50.10 |
| Zinc oxide, active | 5 | 4.64 | 4.60 |
| Wood tar | 1 | 2.22 | |
| Mineral rubber | | 6.48 | |
| | 99.55 | 100.00 | 100.00 |
| Vulcanization | 20×4 | 20×4 | 20×4 |
| Breaking strain in kgs. per sq. cm | 183 | 154 | 138.50 |
| 3 days aged | 74 | 91.50 | 72.50 |
| 6 days aged | 59.5 | 73.50 | 96.50 |
| Elongation in percent | 250 | 290 | 185 |
| 3 days aged | 80 | 165 | 100 |
| 6 days aged | Hard | 40 | 10 |
| Hardness (Schopper scale) | 25 | 32 | 24 |
| Loss by abrasion | 0.20 | 0.30 | 0.30 |
| Specific gravity | 1.29 | 1.32 | 1.33 |

(10) *Accumulator containers*

| | Parts by weight |
|---|---|
| Smoked sheets | 15 |
| Tire cover regenerate | 9 |
| Naftolen R 100 | 6.70 |
| Sulphur | 10 |
| Vulcanite powder | 29 |
| Amorphous silicic acid | 22 |
| Heavy spar | 8 |
| Vulkazit C. T | 0.30 |
| | 100.00 |

Vulcanization _____ 105×4

(11) *Cycle inner tubes*

| | Parts by weight |
|---|---|
| Light crepe | 46.70 |
| Naftolen 550 | 9. |
| Sulphur | 1.80 |
| Zinc oxide | 4 |
| Stearic acid | 0.50 |
| Vulkan red L. K. F | 0.60 |
| Vulkan genuine orange G. F | 0.16 |
| Rape seed oil factis | 2 |
| Vulkazit D. M | 0.35 |
| Vulkazit H | 0.10 |
| Aldol-α-naphthylamine powder | 0.25 |
| Titanium white | 3.54 |
| Osmotic kaolin | 20 |
| | 89.00 |

Vulcanization_____ 15×3
Breaking strain kgs./cm.²_____ 200
Elongation_____ 720%

This application is a continuation-in-part of our application Serial No. 52,322, filed Nov. 30, 1935.

We claim:

1. A rubber mixture adapted for use in the manufacture of rubber goods, said mixture comprising as essential ingredients rubber and unsaturated hydrocarbon compounds having the general formula $(C_3H_4)_n$, said hydrocarbon compounds being viscous materials of high molecular weight, being compatible with rubber in all proportions, being soluble in sulfuric acid, being highly reactive with sulfur, being present in the mixture in an amount from 5 per cent to 100 per cent of the amount of rubber, and being capable of co-vulcanization with sulfur and rubber to produce high quality rubber goods.

2. A rubber mixture adapted for use in the manufacture of rubber goods, said mixture comprising, as essential ingredients, rubber and unsaturated hydrocarbon compounds having substantially the composition 90 per cent carbon and 10 per cent hydrogen, and having the characteristics of compounds of this composition derived from the residues of petroleum refining, said hydrocarbon compounds being viscous materials of high molecular weight, being compatible with rubber in all proportions, being soluble in sulfuric acid, being highly reactive with sulfur, being present in the mixture in an amount from 5 per cent to 100 per cent of the amount of rubber, and being capable of co-vulcanization with sulfur and rubber to produce high quality rubber goods.

3. The mixture of claim 2, wherein at least a portion of the rubber is regenerated rubber.

4. The mixture of claim 2 containing factis, wherein at least a part of the said unsaturated hydrocarbon compounds replaces part of the factis normally employed in such mixtures in the absence of said hydrocarbon compounds.

5. The mixture of claim 2 containing sulfur, wherein the amount of sulfur in said mixture is increased over that normally employed in similar mixtures free from said unsaturated hydrocarbon compounds to counteract the softening effect of said unsaturated hydrocarbon compound.

6. The mixture of claim 2 containing active filler, wherein the amount of rubber present is decreased as compared with similar mixtures free from said unsaturated hydrocarbon compounds and the amount of active filler is increased as compared with said similar mixtures, the increased amount of active filler being rendered compatible by said unsaturated hydrocarbon compounds.

7. The mixture of claim 2, wherein at least a portion of the rubber is regenerated rubber prepared by heating vulcanized rubber with at least a portion of said hydrocarbon compounds.

8. The mixture of claim 2, wherein at least a portion of the rubber is synthetic rubber.

9. The mixture of claim 2, in which the said hydrocarbons are co-vulcanized with the said rubber and sulfur.

10. A process of producing rubber articles from rubber-containing mixtures, which comprises replacing 10 to 50 per cent of the rubber in the mixtures with unsaturated hydrocarbon products from acid sludges derived from the sulfuric acid refining of mineral oil products by subjecting these acid sludges to vacuum distillation in the presence of lime.

11. A process of producing rubber articles which comprises replacing from 10 to 50 per cent of the rubber in the usual rubber mixtures containing zinc oxide, sulfur, stearic acid and accelerator with the unsaturated hydrocarbon products obtained by vacuum distillation in the presence of neutralizing agent of acid sludges derived from the sulfuric acid refining of mineral oils.

FRITZ ROSTLER.
VILMA MEHNER.